US010400473B2

(12) United States Patent
Suarez Lainez et al.

(10) Patent No.: US 10,400,473 B2
(45) Date of Patent: Sep. 3, 2019

(54) APPARATUS FOR DETECTING THE POSITION OF WINDOW HANDLES OR DOOR HANDLES BASED ON THE SENSING OF MAGNETIC FIELDS, AND OPERATING METHOD FOR IT

(71) Applicant: Robert Bosch GmbH, Stuttgart (DE)

(72) Inventors: Fernando Suarez Lainez, Reutlingen (DE); Christoph Volk, Munich (DE); Frank Schindler, Reutlingen (DE); Juan Nogueira-Nine, Stuttgart (DE); Wolf-Bastian Poettner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/555,743

(22) PCT Filed: Apr. 13, 2016

(86) PCT No.: PCT/EP2016/058117
§ 371 (c)(1),
(2) Date: Sep. 5, 2017

(87) PCT Pub. No.: WO2016/166158
PCT Pub. Date: Oct. 20, 2016

(65) Prior Publication Data

US 2018/0051479 A1 Feb. 22, 2018

(30) Foreign Application Priority Data

Apr. 17, 2015 (DE) ........................ 10 2015 207 040

(51) Int. Cl.
*G01B 7/14* (2006.01)
*E05B 17/22* (2006.01)
(Continued)

(52) U.S. Cl.
CPC .............. *E05B 17/22* (2013.01); *E05B 45/06* (2013.01); *E05B 2045/0665* (2013.01); *E05B 2047/0067* (2013.01)

(58) Field of Classification Search
CPC .. E05B 17/22; E05B 45/06; E05B 2045/0665; E05B 2047/0067;
(Continued)

(56) References Cited

U.S. PATENT DOCUMENTS

2009/0102649 A1* 4/2009 Diener .................... E05B 45/06 340/542
2011/0016971 A1* 1/2011 Yulkowski ........... G08B 21/043 73/493
(Continued)

FOREIGN PATENT DOCUMENTS

CN 103732843 A 4/2014
DE 202005000784 U1 5/2006
(Continued)

OTHER PUBLICATIONS

International Search Report dated Jul. 1, 2016, of the corresponding International Application PCT/EP2016/058117 filed Apr. 13, 2016.

*Primary Examiner* — Thang X Le
(74) *Attorney, Agent, or Firm* — Norton Rose Fulbright US LLP; Gerard Messina

(57) ABSTRACT

An apparatus for detecting the position of window handles or door handles, the apparatus including a magnetic-field sensor and a microcontroller unit, the microcontroller unit being designed to read out data from the magnetic-field sensor, to record a magnetic fingerprint for at least one window-handle/door-handle position, and to detect the at least one window-handle/door-handle position by comparing data of the magnetic-field sensor with the recorded
(Continued)

magnetic fingerprint. An operating method for such a window handle or door handle is also described.

6 Claims, 2 Drawing Sheets

(51) Int. Cl.
*E05B 45/06* (2006.01)
*E05B 47/00* (2006.01)

(58) Field of Classification Search
CPC ......... E05B 2047/0072; E05B 47/0001; E05B 83/10; E05C 19/16; E05C 19/02; E06B 7/28; G08B 13/08; G08B 13/14; G08B 13/2491; G08B 29/183; G08B 29/181; G08B 29/20; G01B 7/14
See application file for complete search history.

(56) References Cited

U.S. PATENT DOCUMENTS

2013/0327142 A1* 12/2013 Hogan .................... E05B 45/06 73/493
2016/0040460 A1* 2/2016 Kasai .................. E05B 47/0001 292/251.5

FOREIGN PATENT DOCUMENTS

| | | | |
|---|---|---|---|
| DE | 102011013730 | A1 | 9/2012 |
| GB | 2146063 | A | 4/1985 |
| WO | 2004109236 | A1 | 12/2004 |

* cited by examiner

APPARATUS FOR DETECTING THE POSITION OF WINDOW HANDLES OR DOOR HANDLES BASED ON THE SENSING OF MAGNETIC FIELDS, AND OPERATING METHOD FOR IT

BACKGROUND INFORMATION

These days, sensors are employed in smart home solutions (IoT) for monitoring window positions/door positions. The information may be used for security applications or for supplying information to smart home solutions in order to detect states on the basis of the movement pattern of the window or the door. These states are reported to a control unit, which informs the user or another application about them. Accordingly, sensors (e.g., acceleration sensors, gyroscopes and/or magnetometers) are mounted on a window/door in order to detect such position states. The state is thereupon communicated via a wireless link to other applications. Most existing design approaches make use of an additional part, which is based on a reed switch that is placed statically on the window/door in order to detect the handle position as well as the locked/unlocked state. Our approach is a stand-alone sensor solution that needs no additional components to be installed on the window.

SUMMARY

An object of this invention is to detect the present position of a window handle/door handle by sensing magnetic fields, without the use of additional parts such as reed switches, magnets or additional mechanical components.

The present invention relates to an apparatus for detecting the position of window handles or door handles based on the sensing of magnetic fields. The present invention likewise relates to an operating method for such an apparatus for detecting window-handle or door-handle positions.

An object of the present invention is to detect window-handle or door-handle positions by sensing magnetic fields. Accordingly, the changes in the magnetic field measured by the sensor signal are analyzed by an implemented algorithm. The change in the magnetic field is produced by the movement of ferromagnetic elements inside the window/door, which are parts of the locking/handle mechanism. These elements are typically part of the window/door, and do not have to be added explicitly in order for this invention to function.

With the recognition of the window-handle/door-handle position, several new applications may be realized:

More robust solutions for monitoring window-handle/door-handle states: By knowing the current handle position of windows and doors, the user is able to verify exact position states of window handles/door handles. That is, if a window is in the closed position, but the handle is not closed, the user will become aware that the window can be opened by the impact of wind or by somebody lingering outside. On the other hand, if the window is in the closed position and the handle is likewise in its closed position, the application is able to conclude that the window cannot be opened by "normal" external stimuli (not taking into account break-in attempts).

Advantages of the present invention may include, for example:

1. No window or door modifications necessary in order to integrate the system.
2. Very easy to install in all types of windows and doors.
3. May be used as retrofit solution.
4. Detection of the position of the window handle/door handle and the state of the locking mechanism.
5. A stand-alone component. One sensor, no external components must be mounted on the window/door for operation.
6. Very cost-efficient.
7. Robust self-calibration.
8. Usable on tilt and sliding doors/windows.
9. Increases the certainty of the detection of a window/door state considerably; indicates not only that the window/door is closed, but also is actually locked.
10. Energy-efficient design approach.
11. Small form factor.

DETAILED DESCRIPTION OF EXAMPLE EMBODIMENTS

Figure 1:
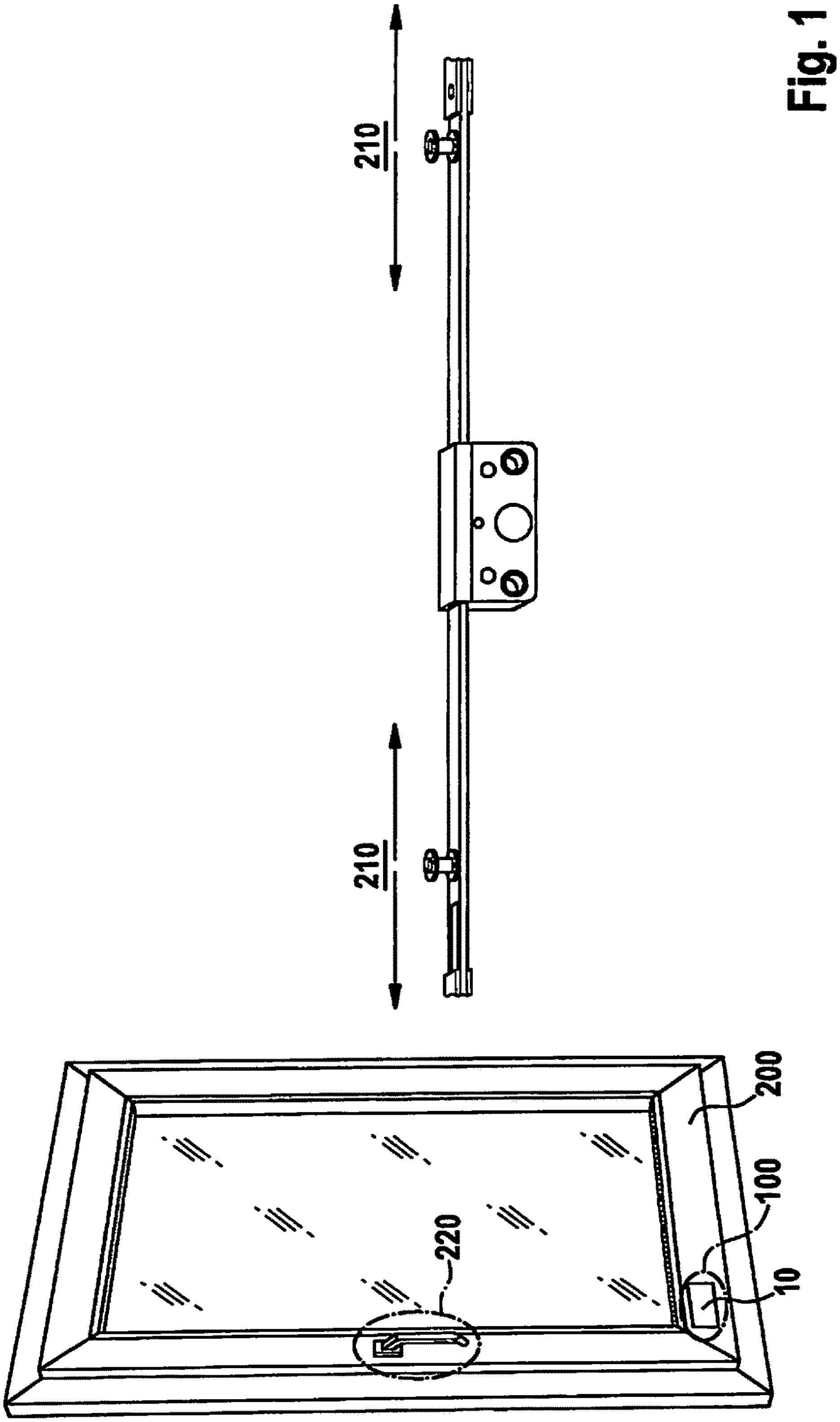
FIG. 1 shows a window and a sensor according to the present invention.

FIG. 1 shows a window and a sensor according to the present invention. The object of the present invention is to detect the present position of a window handle/door handle by sensing magnetic fields, without the use of additional parts such as reed switches, magnets or additional mechanical components. This is realized by placing a magnetometer sensor in a carefully thought-out position close to the window/door locking mechanism where, based on moving ferromagnetic parts that are responsible for the locking/unlocking operations of the window/door (handle drive equipment), the sensor is able to measure changes in the magnetic field. The locking mechanism determines whether the window/door is able to attain one of the following states: open, closed, or tilted (naturally, more states are possible and are likewise able to be detected). Reference to FIG. 1. The determined state may then be reported via communication means like, for instance, wire-bound or wireless (Bluetooth, Wi-Fi, zigbee, Lora, . . . ) to another application.

The present invention is realized as an apparatus (or part of an apparatus), which is mounted statically on the frame of a window/door or integrated into it, and includes the following components:

A sensor 10, which measures magnetic fields in various axes. A magnetometer sensor may be installed in a certain position 100, for example, at the bottom or top on the frame of the window/door. Changes in handle lever position 220 place sliding pins 210 of window locking mechanism 200 into certain positions.

The sensor may be aligned with the ferromagnetic parts of the inner sliding mechanism, which are controlled by the window handle/door handle. This makes it possible to detect the present state of the window handle/door handle, and thereby to warn the user if a window/door is closed but not locked.

A microcontroller unit 20, which is integrated together with the sensor. The controller communicates with the sensor in order to request measurements, and executes the software that contains the detection algorithms.

Algorithm 1—310, a part of software 300 which runs on the microcontroller, is used to "take fingerprints" of magnetometer-sensor measured values. The algorithm makes it possible to take "fingerprints" based on magnetic-sensor data and to store them. Furthermore, it permits the comparison of the current magnetic-sensor measured-value data with the stored fingerprints. The present measurement and a fingerprint are regarded as alike if their difference lies below a configurable threshold.

Algorithm 2—320, a part of software 300 which runs on the microcontroller, uses algorithm 1 to determine the present position of the window handle/door handle. The algorithm is able to determine various position states: "Handle for window/door locked in closed position;" "handle for window/door unlocked in open position;" "handle for window/door in tilt position" (and other states, if usable on a special window/door), based on the similarity of the present measurement with the stored fingerprints.

A wire-bound or wireless connectivity interface 400 (e.g., Bluetooth), which is used to transport the state of the window handle/door handle that was determined by the algorithm, to another application (actuator, access-control process, etc.).

While software 300 is running, magnetometer sensor 10 periodically provides measurements, and the algorithm conditions the signals by a filtering process in order to reduce noise or unwanted data values.

At the beginning, the application enables the user to record specific window handle/door handle states based on the measured magnetic field in each specific handle position. These values are then stored and used as fingerprints. As soon as fingerprints have been taken of all desired positions, the software starts the monitoring process, during which, in each iteration, the implemented algorithm evaluates the instantaneous sensor measurement and assesses whether or not it agrees with any of the recorded fingerprints. As a result, the software is able to detect and report the correct handle position.

In order to improve the result, the algorithm may automatically update the fingerprints, in the event magnetic distortions impair the system. This is carried out in an automatic calibration process that communicates with the algorithm.

Figure 2:
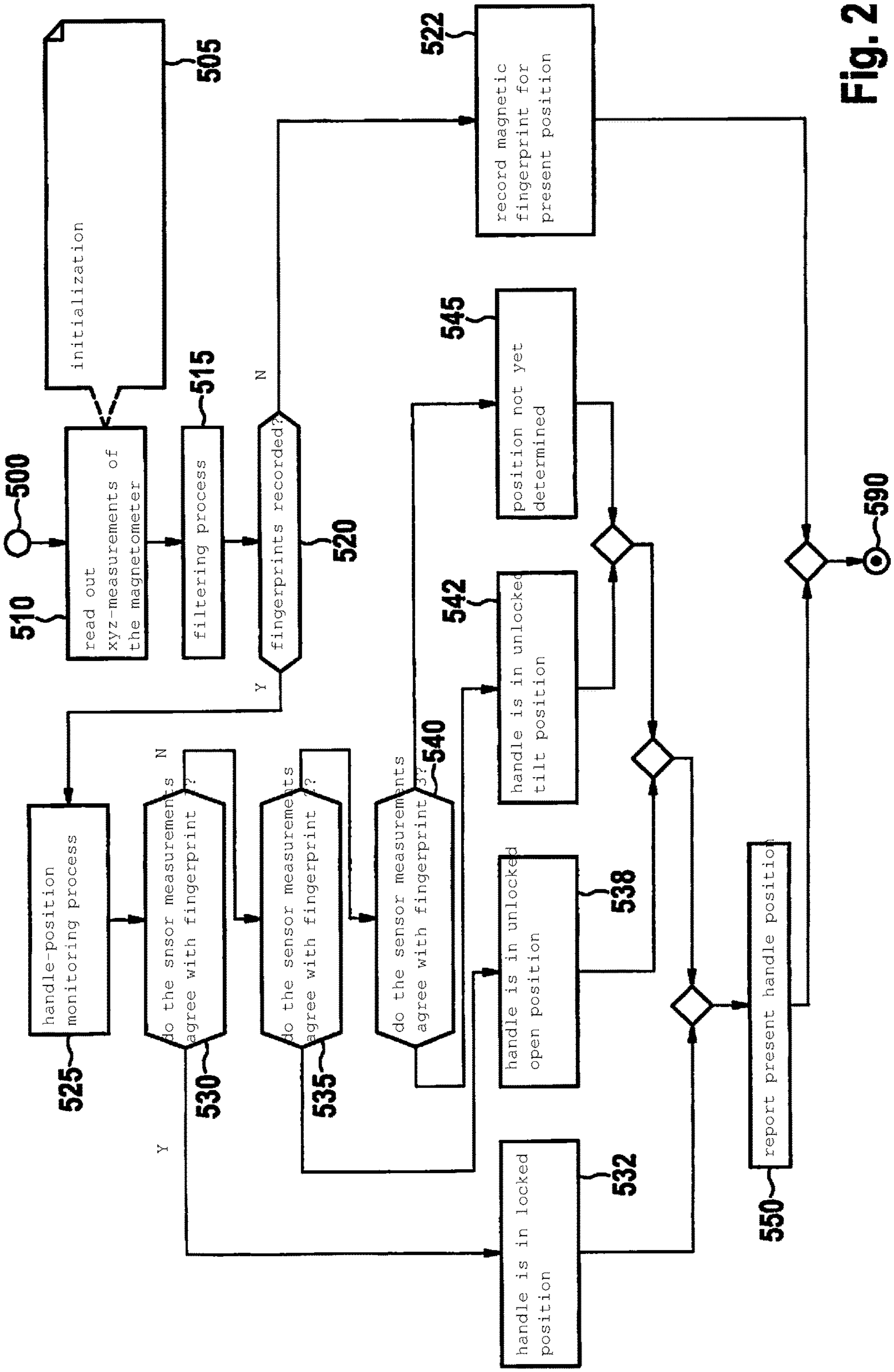
FIG. 2 in a flowchart, shows an example of the operating method according to the present invention.

FIG. 2, in a flowchart, shows an example of the operating method according to the present invention. The operating method according to the invention functions in this example as follows:

500 Start
505 Initialization
510 Read out xyz-measurements of the magnetometer
515 Filtering process
520 Decision: Fingerprints recorded?
522 Record magnetic fingerprint for present position
525 Handle-position monitoring process
530 Decision: Do the sensor measurements agree with fingerprint 1?
532 Handle is in locked closed position
535 Decision: Do the sensor measurements agree with fingerprint 2?
538 Handle is in unlocked open position
540 Decision: Do the sensor measurements agree with fingerprint 3?
542 Handle is in unlocked tilt position
545 Position not yet determined
550 Report present handle position
590 End

REFERENCE NUMERAL LIST

10 Sensor
100 Sensor position
20 Microcontroller unit

200 Window locking mechanism
210 Sliding pin
220 Handle position
300 Software
310 Algorithm 1
320 Algorithm 2
400 Wire-bound or wireless connectivity interface
500 Start
505 Initialization
510 Read out xyz-measurements of the magnetometer
515 Filtering process
520 Decision: Fingerprints recorded?
522 Record magnetic fingerprint for present position
525 Handle-position monitoring process
530 Decision: Do the sensor measurements agree with fingerprint 1?
532 Handle is in locked closed position
535 Decision: Do the sensor measurements agree with fingerprint 2?
538 Handle is in unlocked open position
540 Decision: Do the sensor measurements agree with fingerprint 3?
542 Handle is in unlocked tilt position
545 Position not yet determined
550 Report present handle position
590 End

What is claimed is:

1. An apparatus for detecting the position of a window handle or a door handle, comprising:
- a magnetic-field sensor; and
- a microcontroller unit configured to read out data from the magnetic-field sensor, to record a magnetic fingerprint for at least one window-handle position and/or door-handle position, and to detect the at least one window-handle position and/or door-handle position by comparing data of the magnetic-field sensor with the recorded magnetic fingerprint;
- wherein the magnetic field sensor is installed in a sensor location separate from a location of the window-handle and/or door-handle, so that the magnetic field sensor is alignable with a ferromagnetic part of a window-handle mechanism and/or door-handle mechanism, which are controlled by the window-handle and/or door-handle.

2. The apparatus of claim 1, wherein the ferromagnetic part includes a pin of a locking mechanism.

3. The apparatus of claim 1, wherein the ferromagnetic part includes a sliding pin of a locking mechanism.

4. An method for operating an apparatus for detecting the position of a window handle or a door handle the method comprising:
- reading out data from magnetic-field sensor, wherein the apparatus includes the magnetic-field sensor, and a microcontroller unit configured to read out data from the magnetic-field sensor, to record a magnetic fingerprint for at least one window-handle/door-handle position, and to detect the at least one window-handle/door-handle position by comparing data of the magnetic-field sensor with the recorded magnetic fingerprint;
- recording a magnetic fingerprint for at least one window-handle/door-handle position; and
- detecting the at least one window-handle/door-handle position by comparing data of the magnetic-field sensor with the recorded magnetic fingerprint;
- wherein the magnetic field sensor is installed in a sensor location separate from a location of the window-handle and/or door-handle, so that the magnetic field sensor is alignable with a ferromagnetic part of a window-handle mechanism and/or door-handle mechanism, which are controlled by the window-handle and/or door-handle.

5. The method of claim 4, wherein the ferromagnetic part includes a pin of a locking mechanism.

6. The method of claim 4, wherein the ferromagnetic part includes a sliding pin of a locking mechanism.

* * * * *